Dec. 3, 1957  R. F. DEHN  2,815,074
SHEET CUTTING APPARATUS
Filed March 1, 1954  3 Sheets-Sheet 1

INVENTOR.
Roy F. Dehn
BY Hudson, Boughton,
Williams, David & Hoffmann
ATTORNEYS

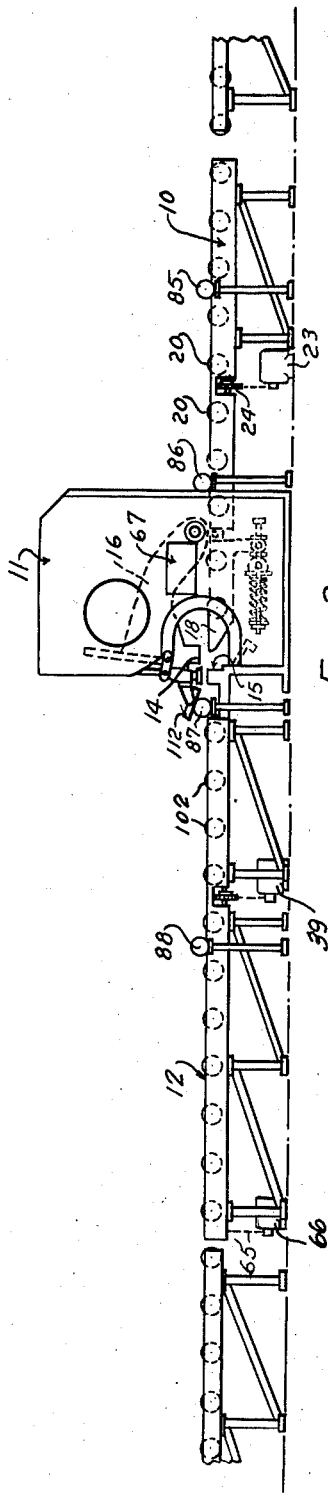
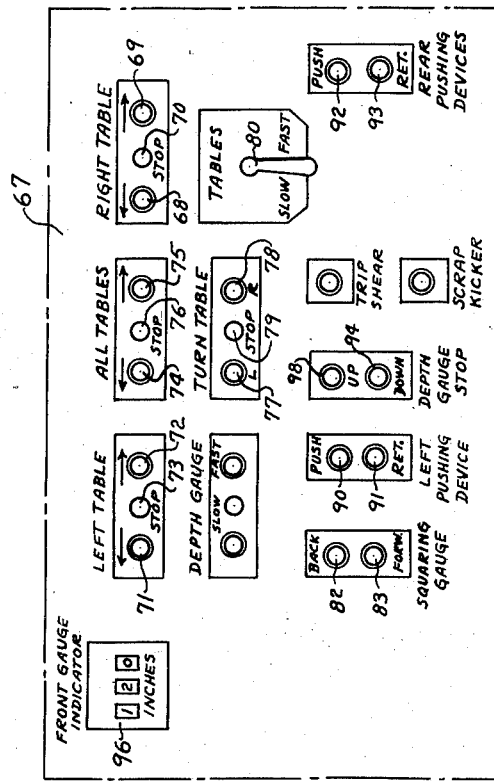
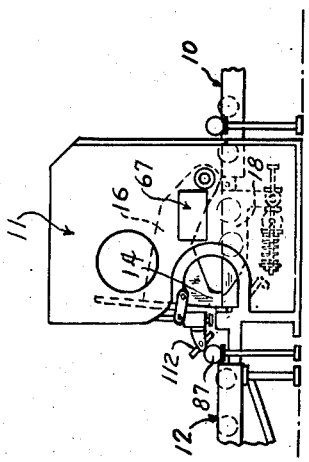

Dec. 3, 1957 R. F. DEHN 2,815,074
SHEET CUTTING APPARATUS
Filed March 1, 1954 3 Sheets-Sheet 3

INVENTOR.
BY Roy F. Dehn
Hudson, Boughton,
Williams, David & Hoffmann
ATTORNEYS

United States Patent Office 2,815,074
Patented Dec. 3, 1957

2,815,074

SHEET CUTTING APPARATUS

Roy F. Dehn, Wickliffe, Ohio, assignor to The Cleveland Crane & Engineering Company, Wickliffe, Ohio, a corporation of Ohio Application March 1, 1954, Serial No. 413,352

3 Claims. (Cl. 164—42)

The present invention relates to shearing apparatus and more particularly to a method of shearing and a metal shearing apparatus adapted to cut lengths of metal from long strips or coils of material.

The principal object of the present invention is the provision of a new and improved machine for severing sheet or strip material and the like comprising shearing means including a movable knife and a relatively fixed knife, the machine being so constructed and arranged that the material is cut without twist distortion at the location of the cut.

Another object of the present invention is the provision of a new and improved shearing apparatus for cutting sheet metal and the like, the apparatus being so constructed and arranged that the length to be cut may be quickly and accurately gauged and the time and labor lost due to the handling of materials is held to a minimum.

Another object of the present invention is the provision of a new and improved machine for cutting or severing sheet or strip material into shorter lengths, the machine having means for facilitating squaring the severed portion and including means enabling the cut portion to be easily rotated during the squaring operation.

Another object of the present invention is the provision of a new and improved machine for cutting strip or sheet material and the like having stationary shears, a receiving table for supporting the length of material to be severed, stop means movable into the path of said material extending from the shears to accurately gauge length of the material to be severed, and means to remove the stop means from the path of the material to allow the severed portion to pass by the stop means.

Another object of the present invention is the provision of a shear press for cutting strip or sheet material comprising shearing means including a relatively fixed knife and a cooperating knife supported by a ram for movement by the edge of the fixed knife, and a feeding table located at the side of the shearing means adjacent the movable knife for feeding material to be cut between the knives of the press, the end portion of the feeding table adjacent the movable knife being deflectable to allow the movable knife to move past the cutting edge of the fixed knife during the shearing operation.

Another object of the present invention is the provision of a novel and improved method of shearing strip metal which minimizes distortion of the metal adjacent the cut.

The invention resides in certain constructions, combinations and arrangements of parts and further objects and advantages will be apparent to those skilled in the art to which it relates from the following description of the preferred embodiment described with reference to the accompanying drawings forming a part of this specification in which:

Fig. 2 is an elevational view of the machine of Fig. 1;

Fig. 3 is an elevational view of the shearing mechanism of the machine of Fig. 1 showing the deflectable apron of the feeding table in its deflected position;

Fig. 4 is a front view of the control panel for the machine of Fig. 1;

Figures 1, 5:
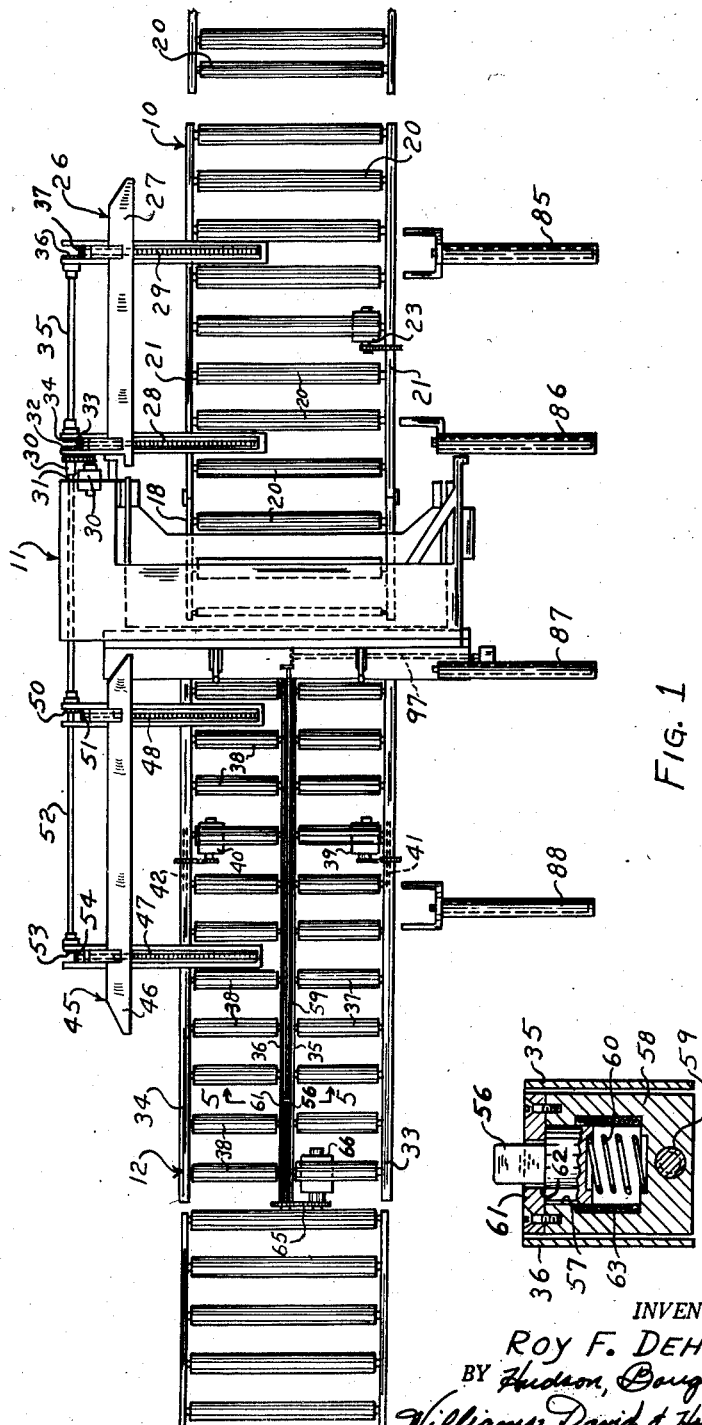
Fig. 1 is a plan view of a machine for cutting strips of metal into shorter lengths and embodying the present invention.
Fig. 5 is a sectional view taken approximately along line 5—5 of Fig. 1.

Referring to the drawings, the cutting machine or shear press illustrated in Figs. 1 to 5 is the preferred embodiment of the present invention. The machine shown comprises a feeding table 10, a shearing mechanism 11 and a receiving table 12. The feeding table 10 is adapted to support strip material or other material to be cut into shorter lengths and to feed the material between a movable knife 14 and a relatively fixed knife 15 of the shearing mechanism 11. The movable knife 14 is above and offset from the knife 15 and is supported for generally vertical movement by a ram 16 pivotally connected to the frame of the shearing mechanism 11. Movement of the ram 16 about its pivot moves the knife 14 generally vertically into and out of shearing relationship with the knife 15. The knife 14 is so supported that its cutting edge will pass the cutting end of the knife 15 with the knife 14 passing the knife 15 intermediate the feeding table 10 and the stationary knife 15 during the severing operation. The means for actuating movement of the movable knife may be of conventional construction and will not, therefore, be shown or described herein, for example, it may be that shown in Wehr Patent 2,397,896. It has been found that when strip material to be cut is fed so that the feed is from the direction in which the movable knife 14 is offset from the stationary knife 15, the cut may be made with minimum distortion occurring to the sheet material around the cut.

The feeding table 10 extends to a point close to the movable knife 14 and the end portion thereof or apron 18 immediately adjacent the knife is pivotally connected to the remainder of the table so that it may be deflected downwardly. During the cutting operation the apron 18 will be engaged by the movable knife 14 and moved downwardly thereby when it moves past the cutting edge of the stationary knife 15 as shown in Fig. 3. A suitable spring loading means is provided to return the apron 18 to its normal position. The spring loading means may be similar to that shown and described in U. S. Patent No. 2,025,418 or of any other conventional construction. The feeding table itself comprises, in the preferred embodiment, a plurality of spaced rollers 20 supported between spaced parallel frame members 21 lying in a horizontal plane. The rollers 20 are adapted to support and move the strip material to be fed to the shearing mechanism 11 and may be power driven. In the illustrated embodiment the rollers 20 of the feeding table including those rollers on the apron 18 are driven by a reversible motor 23 mounted under the feed table 10. The particular connection between the motor 23 and the rollers 20 forms no part of the present invention and has been illustrated partly schematically as comprising a shaft 24 mounted within the front horizontal member 21, considering the machine as viewed in Fig. 2. The shaft 24 is operatively connected through suitable drive means to the rollers 20.

The feeding table 10 is also provided with a squaring gauge and guide mechanism 26 for the strip material being fed to the shearing mechanism 11. The mechanism 26 is supported from the rear horizontal frame member 21 and comprises a guide bar 27 supported parallel to the member 21 and movable toward and away from the feeding table 10 by spaced lead screws 28, 29 extending outwardly of the feeding table 10 and adapted to move the guide bar 27 inwardly of the horizontal member 21. The lead screws are rotated to move the guide bar 27 by a reversible motor 30 mounted on the rear side of the machine and operatively connected to a horizontal shaft 31 to cause rotation of the shaft. The shaft 31 has a bevel gear 32 on its right hand end which is in mesh with a cooperating bevel gear 33 on the rear end of the lead screw 28 adjacent the shearing mechanism 11. The bevel gear 33 also meshes with another bevel gear 34 which is mounted on the end of a horizontal shaft 35 extending to the rear end of the lead screw 29. The lead screw 29 is rotated by a bevel gear 36 mounted on the end of the shaft 35 remote from the bevel gear 34 and in mesh with a bevel gear 37 on the rear end of the lead screw 29. It will be seen from the above that operation of the motor 30 will cause the guide bar 27 to move toward or away from the feeding table 10 depending upon its direction of rotation.

The receiving table 12 is adapted to support the length of material extending from the shearing mechanism 11 prior to and during the severing operation as well as after the shear has been made. The table 12 comprises spaced parallel frame members 33, 34 lying in a horizontal plane and extending in a direction parallel to the direction of movement of the strip material being cut. Located intermediate the frame members 33, 34 are spaced parallel vertical plates 35, 36. The plates 35, 36 are approximately midway between the frame members 33, 34 and journally support one end of rollers mounted between the plates 35, 36 and the frame members 33, 34 respectively. Rollers 37 are located between the frame member 33 and the plate 35 while rollers 38 are mounted intermediate the plate 36 and the frame member 34. The rollers 37, 38 are adapted to engage the sheared piece and to provide supporting surfaces for the strip of metal extending from the shearing mechanism 11 prior to and during the severing operation. The rollers are preferably power driven by suitable means which, in the illustrated embodiment, comprises motors 39, 40 operatively connected to shafts 41, 42 respectively located within the frame members 33, 34 respectively. The motors 39, 40 are reversible motors and the operation thereof causes the rollers 37, 38 to rotate so as to cause the material thereon to move away from or toward the shearing mechanism depending upon the direction of rotation. Preferably the rollers 37, 38 are inclined downwardly toward the center of the receiving table 12 for reasons that will appear hereinafter.

Receiving table 12 is provided with a squaring gauge and guiding mechanism 45 similar in construction to the mechanism 26 and comprising a guide bar 46 and spaced lead screws 47, 48. The guide bar 46 is supported parallel to the frame members 33, 34 for movement toward and away from the center of the receiving table 12. The lead screws 47, 48 extend outwardly from the receiving table 12 and are adapted to be rotated to cause the aforesaid movement of the guide bar by the reversible motor 30 operatively connected to the lead screws by shaft 31, bevel gears 50, 51, shaft 52, and bevel gears 53, 54. The arrangement of the aforesaid mechanism for connecting motor 30 to the lead screws 47, 48 is the same as that for connecting the motor 30 to the lead screws 28, 29 of the feeding table 10 and therefore will not be described in detail.

A stop member 56 is mounted intermediate the plates 35, 36 of the receiving table 12 and is adapted to project upwardly into the path of sheet material on the receiving table 12. The stop member 56 is movable longitudinally of the receiving table 12 and serves as a stop gauge to determine the length of material to be severed. As illustrated in Fig. 5, the stop member 56 is supported for vertical movement in a vertical bore 57 of a block 58 located intermediate the plates 35, 36 and threadingly engaging a lead screw 59 which passes through the lower portion of the block 58. A compression spring 60 is located intermediate the stop member 56 and the bottom of the bore 57 and urges the stop member into its projected position. The upward movement of the stop member 56 is limited by a plate 61 on top of the block 58 which engages a shoulder 62 on the stop member 56. The stop member 56 is retracted to allow the passage of material thereover by the energization of a solenoid 63 surrounding the lower portion of the bore 57. The stop member is moved longitudinally of the receiving table 12 by the rotation of lead screw 59. The lead screw 59 is rotated by a motor 66 operatively connected to the lead screw through a chain drive 65.

A control panel 67 for controlling the operation of the machine is mounted on the front side of the shearing mechanism 11. The control panel 67 includes push button switches 68, 69 and 70 for controlling the operation of the right or feed table 10. The push button 68 when depressed causes the motor 23 to rotate in the direction necessary to rotate the rollers 20 counterclockwise and move any material thereon toward the shearing mechanism 11. Depression of the push button 69 causes the motor 23 to rotate in the opposite direction and the rollers 20 to rotate in a clockwise direction. Push button 70 stops the operation of the motor 23.

The operation of the left table or receiving table 12 is controlled by push buttons 71, 72 and 73 on the control panel 67. Depressing the push button 71 causes the motors 39, 40 to rotate the rollers 37 and 38 in a counterclockwise direction to move material on the receiving table 12 away from the shearing mechanism 11. Depressing the push button 72 causes the motors 39, 40 to rotate in the opposite direction and move the material on the receiving table 12 toward the shearing mechanism 11. The simultaneous operation of motors 39, 40 to rotate the rollers 37, 38 in the same direction is stopped by depressing push button 73. The control panel 67 also includes a push button 74 which causes the energization of the motors 23, 39, 40 to simultaneously operate the receiving table 12 and the feeding table 10 to move the material thereon to the left as the machine is viewed in Fig. 2. A corresponding push button 75 is provided for causing the simultaneous energization of the motors 23, 39, 40 to move material on the feeding table 10 and the receiving table 12 to the right. A stop button 76 is provided for stopping the simultaneous operation of the feed and receiving tables.

Depression of a push button 77 mounted on the control panel 67 causes the motor 39 to rotate the rollers 37 of the receiving table in one direction and the motor 40 to rotate the rollers 38 in the opposite direction. Assuming that the rollers 37, as viewed in Fig. 1, are rotated counterclockwise and the rollers 38 rotated clockwise the rollers will tend to rotate any material on the receiving table 12 in a clockwise direction. A push button 78 is also provided to energize the motors 39 and 40 so that the rollers 37, 38 will be rotated in opposite directions so as to impart the clockwise movement to any material located on the receiving table 12. Depression of a push button 79 stops the motors 39 and 40 when rotating in opposite directions. The downward inclination of the rollers 37, 38 toward the center of receiving table 12 aids in imparting a turning movement to the material on the table.

The material or sheet to be cut is placed on the feeding table 10 and is moved to the shearing mechanism 11 by operation of the motor 23. A control lever 80 is mounted on the control panel 67 to control the speed of operation of the various motors for driving the tables 10 and 12. The squaring gauges and guide mechanisms 26, 45 are adjusted to accommodate the width of the strip material to be cut by depressing push buttons 82, 83. Depressing the push button 82 will cause operation of the motor 30 to move the gauges 26, 45 away from the tables 10, 12. The switch controlled by the push button 82 is of such a type that the motor circuit is broken when the push button is released. The push button 83 is similar to the push button 82 but causes the motor 30 to operate to move the squaring gauges and guides 26, 45 towards the tables 10, 12.

In order to assure that the material to be cut is against the bars 27, 46 of the mechanisms 26, 45 respectively hydraulic pushers 85, 86, 87 and 88 are located on the front side of the tables 10, 12. The pushers 85, 86 are located adjacent the feed table 10 and are energized to push the material on the table 10 against the squaring gauge 26 by depressing push button 90 and are returned to their normal inactive position by depressing push button 91. The pushing devices 87, 88 are located adjacent the front side of the receiving table 12 and are actuated to move inwardly to push material against the squaring gauge 45 by depressing push button 92 and are returned to their inactive position by depressing push button 93.

The length of the material to be cut from the sheet or strip is determined by the position of the stop member 56. The tables are operated to move the strip material against the stop member which is held in its projected position by spring 60. After the material has been gauged and cut, the stop member 56 may be retracted to allow the material on the receiving table 12 to pass thereover by depressing push button 94 located on the control panel 67 to energize solenoid 63. Preferably an indicator 96 is provided to indicate the setting of the stop member. The indicator 96 is connected to the lead screw 59 by suitable gearing and drive mechanism 97. Rotation of the lead screw 59 to vary the position of the stop member 56 also causes rotation of the gearing mechanism 97 leading to the indicator 96 causing the position of the stop member to be reflected on the face of the indicator. The stop member 56 is returned to its projected position by depressing push button 98 which deenergizes solenoid 63.

Figure 6:
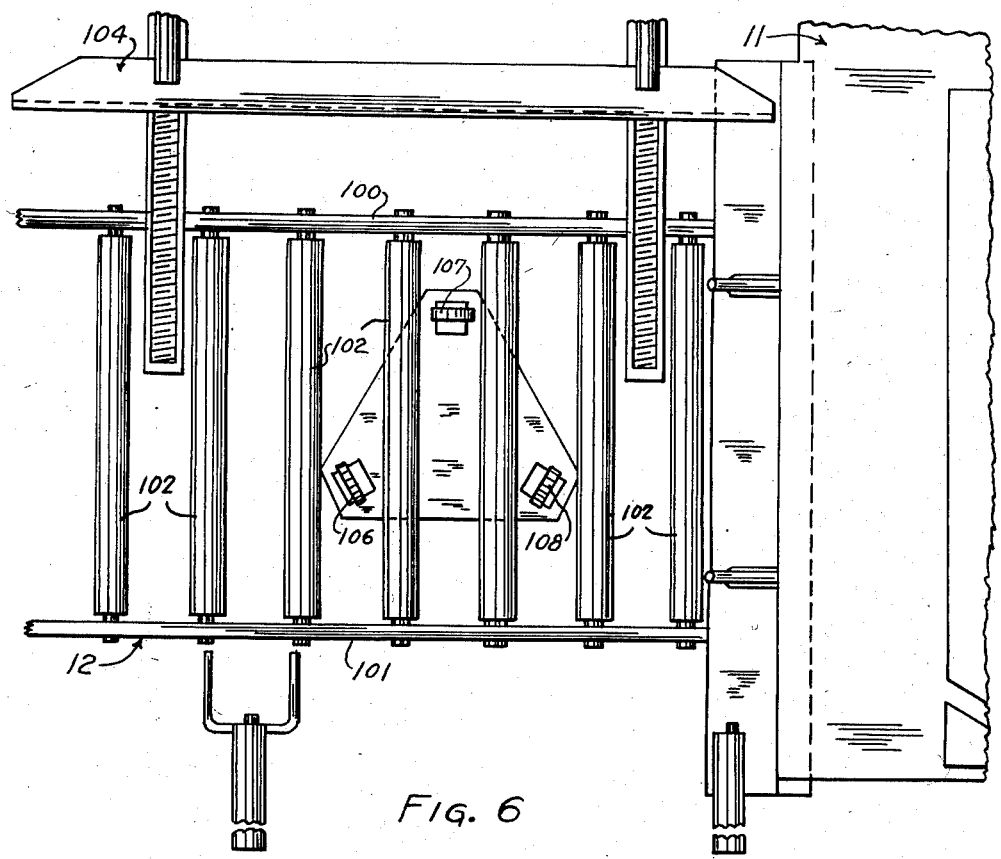
Fig. 6 is a fragmentary plan view showing an alternative construction for the receiving table of the machine illustrated in Fig. 1.
Figure 7:
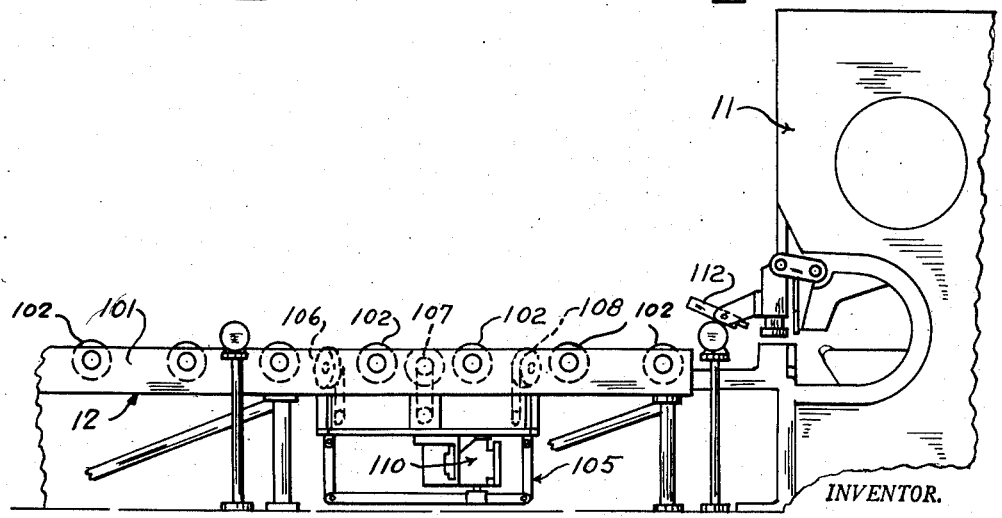
Fig. 7 is an elevational view of the receiving table shown in Fig. 6.

Figs. 6 and 7 of the drawing illustrate an alternative construction for the receiving table. As shown therein the receiving table comprises spaced horizontal frame members 100, 101 having spaced parallel transverse rollers 102 journally supported therebetween. The rollers 102 are similar to the rollers 20 of the feeding table 10 illustrated in Figs. 1 and 2 and are preferably power driven by a reversible drive means. The receiving table 12 is provided with an adjustable squaring gauge or guide 104 which is of the same construction and operates in a manner similar to the squaring gauge and guides 26, 45 described above.

A frame 105 is supported for vertical movement under the rollers 102 and has journally supported thereon three spaced rollers 106, 107 and 108. The frame 105 is adapted to be moved vertically by a hydraulic mechanism 110 connected to the frame. The rollers 106, 107 and 108 are supported on the frame 105 so that they are located intermediate driven pairs of adjacent rollers 102 of the receiving table and so that they can be moved to a point above the rollers 102 and retracted to a point below the rollers 102. The rollers 106, 107 and 108 are power driven and are located at such an angle with respect to each other that material supported on the rollers will be given a rotative movement when the rollers are driven. The power means for driving the rollers 106, 107 and 108 is indicated schematically in Fig. 7 and is preferably of a reversible type. In the illustrated embodiment the axes of the rollers 106, 107 and 108 intersect at a common point and define an angle with each other of approximately 120 degrees.

From the above it will be seen that a sheet or a plate to be trimmed or squared may be easily rotated when on the receiving table 12 by causing the hydraulic mechanism 110 to raise the rollers 106, 107 and 108 into engagement with the material and by energizing the power means for driving the rollers to rotate the plate or other material so that it presents the proper edge to the shearing mechanism 11. Hydraulic kickers 112 are supported by the frame of the shearing mechanism 11 so that they are in position to knock any scrap material from the surfaces along the edge of the knife 15 which result from the trimming or squaring operation.

It will be seen from the above description that a machine embodying the present invention reduces the time involved in handling and squaring cut material and generally speeds up the operation of shearing strip material into shorte lengths. As hereinbefore mentioned the feeding of the strip material from the direction in which the movable blade of the shearing mechanism is offset from the relatively fixed blade greatly reduces the distortion of the material in the area of the cut.

While preferred embodiments of the present invention have been described in considerable detail it will be apparent that the invention is not limited to the constructions shown or the uses referred to and it is the intention to hereby cover all adaptations, modifications and changes which come within the practice of those skilled in the art to which the invention relates and the scope of appended claims.

Having thus described my invention, I claim:

1. A machine for cutting material comprising shearing means including a movable knife and a relatively fixed knife, said movable knife being offset to one side of said fixed knife but adapted to cooperate therewith in shearing material between said knives, feeding means adjacent said shearing means adapted to support and feed strip material to said shearing means from said one side comprising rollers and power actuated means for driving the rollers, a receiving table on the opposite side of said shearing means to said feeding means for receiving and supporting the portion of said strip material extending from said opposite side of said shearing means and including a gauge member movable to a position in the path of the leading edge of material exiting from said shearing means to gauge the length of the material to be cut, means for moving said gauge member to said position in the path of the material being cut and to a position clear of the path of the material being cut, and means for moving the gauge member toward and away from said shearing means, said table including power-driven roller means for engaging severed material on said table to move the material away from said shearing means and comprising roller means selectively operable in different directions to impart a rotative movement to the severed material on the table, a motor-driven guide and squaring member alongside said receiving table, and means supporting said guide and squaring member for movement toward and away from said table.

2. A machine for cutting material comprising shearing means including a movable knife and a relatively fixed knife, said movable knife being offset to one side of said fixed knife but adapted to cooperate therewith in shearing material between said knives, feeding means adjacent said shearing means adapted to support and feed strip material to said shearing means from said one side comprising rollers and power actuated means for driving the rollers, a receiving table on the opposite side of said shearing means to said feeding means for receiving and supporting the portion of said strip material extending from said opposite side of said shearing means and including a gauge member movable to a position in the path of the leading edge of material exiting from said shearing means to gauge the length of the material to be cut, power actuated means for moving said gauge member to said position in the path of the material being cut and to a position clear of the path of the material being cut, and power actuated means for moving the gauge member toward and away from said shearing means, said table including power-driven roller means for engaging severed material on said table to move the material away from said shearing means and comprising roller means selectively operable in different directions to impart a rotative movement to the severed material on the table, a motor-driven guide and squaring member alongside said receiving table, and means supporting said guide and squaring member for movement toward and away from said table.

3. A machine for cutting material comprising shearing means including a movable knife and a relatively fixed knife, said movable knife being offset to one side of said fixed knife but adapted to cooperate therewith in shearing material between said knives, a feed table adjacent to said shearing means adapted to support and feed strip material to said shearing means from said one side comprising rollers and power actuated means for driving the rollers, a receiving table on the opposite side of said shearing means to said feeding table for receiving and supporting the portion of said strip material extending from said opposite side of said shearing means and including a gauge member movable to a position in the path of the leading edge of material exiting from said shearing means to gauge the length of the material to be cut, power actuated means for moving said gauge member to said position in the path of the material being cut and to a position clear of the path of the material being cut, and power actuated means for moving the gauge member toward and away from said shearing means, said receiving table including power-driven roller means for engaging severed material on said receiving table to move the material away from said shearing means and comprising roller means selectively operable in different directions to impart a rotative movement to the severed material on the receiving table, first and second motor-driven guide and squaring members alongside said feed table and said receiving table respectively, and means supporting said guide and squaring members for movement toward and away from said tables.

References Cited in the file of this patent

UNITED STATES PATENTS

| 954,396 | Klindworth | Apr. 5, 1910 |
| 1,012,805 | Bryen | Dec. 26, 1911 |
| 1,142,974 | Leonhauser | June 15, 1915 |
| 1,150,921 | Worthington | Aug. 24, 1915 |
| 1,665,209 | Huston | Apr. 10, 1928 |
| 2,025,418 | Moore | Dec. 24, 1935 |
| 2,196,684 | Rodder et al. | Apr. 9, 1940 |
| 2,219,049 | McArthur | Oct. 22, 1940 |
| 2,316,971 | Overacker et al. | Apr. 20, 1943 |
| 2,623,590 | Johnson et al. | Dec. 30, 1952 |
| 2,663,784 | Iversen | Dec. 22, 1953 |

FOREIGN PATENTS

| 458,228 | Great Britain | Dec. 15, 1936 |